(12) United States Patent
Shimizu et al.

(10) Patent No.: US 9,365,706 B2
(45) Date of Patent: Jun. 14, 2016

(54) CROSSLINKED COMPOSITION, METHOD FOR PRODUCING CROSSLINKED COMPOSITION, AND MOLDED PRODUCT

(75) Inventors: Daisuke Shimizu, Tokyo (JP); Yoshifumi Araki, Tokyo (JP); Katsumi Suzuki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/344,682

(22) PCT Filed: Sep. 14, 2012

(86) PCT No.: PCT/JP2012/073674
§ 371 (c)(1),
(2), (4) Date: May 6, 2014

(87) PCT Pub. No.: WO2013/039220
PCT Pub. Date: Mar. 21, 2013

(65) Prior Publication Data
US 2014/0357798 A1 Dec. 4, 2014

(30) Foreign Application Priority Data
Sep. 15, 2011 (JP) ................................. 2011-201575

(51) Int. Cl.
| | |
|---|---|
| *C08L 9/06* | (2006.01) |
| *C08L 23/16* | (2006.01) |
| *C08L 53/02* | (2006.01) |
| *C08L 9/00* | (2006.01) |
| *C08K 3/00* | (2006.01) |
| *C08K 3/22* | (2006.01) |

(52) U.S. Cl.
CPC ... *C08L 9/06* (2013.01); *C08L 9/00* (2013.01); *C08L 23/16* (2013.01); *C08L 53/025* (2013.01); *C08K 3/0016* (2013.01); *C08K 2003/2296* (2013.01); *C08L 2205/02* (2013.01); *C08L 2205/03* (2013.01); *C08L 2312/04* (2013.01)

(58) Field of Classification Search
CPC ....... C08L 23/16; C08L 25/08; C08L 53/025; C08L 9/06; C08L 9/00; C08L 25/10; C08L 2205/03; C08L 2205/02; C08K 2003/2296; C08K 3/0016
See application file for complete search history.

(56) References Cited

U.S. PATENT DOCUMENTS

| | | | |
|---|---|---|---|
| 4,808,665 | A | 2/1989 | Patel et al. |
| 4,894,408 | A | 1/1990 | Hazelton et al. |
| 4,978,717 | A | 12/1990 | Hazelton et al. |
| 2002/0128390 | A1 | 9/2002 | Ellul et al. |
| 2011/0281994 | A1 | 11/2011 | Eguchi et al. |
| 2012/0010351 | A1 | 1/2012 | Araki et al. |

FOREIGN PATENT DOCUMENTS

| | | |
|---|---|---|
| EP | 2365031 A1 | 9/2011 |
| JP | S59-006236 A | 1/1984 |
| JP | S61-026641 B | 6/1986 |
| JP | S63-057662 A | 3/1988 |
| JP | H01-132643 A | 5/1989 |
| JP | H02-113046 A | 4/1990 |
| JP | H02-255733 A | 10/1990 |
| JP | H03-017143 A | 1/1991 |
| JP | H03-011291 B | 2/1991 |
| JP | H03-049927 B | 7/1991 |
| JP | H03-234744 A | 10/1991 |
| JP | H06-013628 B | 2/1994 |
| JP | 2002-220493 A | 8/2002 |
| JP | 2005-036169 A | 2/2005 |
| JP | 2006-063156 A | 3/2006 |
| JP | 4231367 B | 12/2008 |
| JP | 2010-090267 A | 4/2010 |
| JP | 2011-184594 A | 9/2011 |
| JP | 2011-246648 A | 12/2011 |
| TW | 201026765 A | 7/2010 |
| WO | 2010/067564 A1 | 6/2010 |
| WO | 2010/104174 A1 | 9/2010 |

OTHER PUBLICATIONS

European Search Report issued in related European Patent Application No. 12831167.7 dated Jan. 7, 2015.
Office Action issued in counterpart Taiwanese Patent Application No. 101133882 dated Mar. 27, 2014.
International Search Report issued in corresponding International Patent Application No. PCT/JP2012/073674 dated Dec. 18, 2012.

*Primary Examiner* — Nathan M Nutter
(74) *Attorney, Agent, or Firm* — Morgan, Lewis & Bockius LLP

(57) ABSTRACT

A crosslinked composition is obtained by crosslinking a composition, containing: 1 to 99 parts by mass of a vinyl aromatic copolymer rubber (I) comprising 5 to 70% by mass of a vinyl aromatic monomer unit and 0.1 to 30% by mass of a conjugated diene monomer unit and having one or more tan δ peak temperatures between 75° C. and 125° C.; 99 to 1 parts by mass of an ethylenic copolymer rubber (II); 10 to 100 parts by mass of an olefinic resin (III) based on 100 parts by mass of a total amount of the vinyl aromatic copolymer rubber (I) and the ethylenic copolymer rubber (II); and 0.01 to 50 parts by mass of a crosslinking agent (IV) based on 100 parts by mass of the total amount of the vinyl aromatic copolymer rubber (I) and the ethylenic copolymer rubber (II).

10 Claims, No Drawings

CROSSLINKED COMPOSITION, METHOD FOR PRODUCING CROSSLINKED COMPOSITION, AND MOLDED PRODUCT

TECHNICAL FIELD

The present invention relates to a crosslinked composition, a method for producing a crosslinked composition, and a molded product.

BACKGROUND ART

Among thermoplastic elastomers, styrene thermoplastic elastomers such as a styrene-butadiene block copolymer (SBS) and a styrene-isoprene block copolymer (SIS), which are block copolymers of a vinyl aromatic compound-a conjugated diene compound, are rich in flexibility and have good rubber elasticity and processability at normal temperature. Therefore, thermoplastic elastomer compositions containing these thermoplastic elastomers have been widely used as a substitute for vulcanized rubber.

Further, thermoplastic elastomer compositions using a hydrogenated block copolymer in which the double bond part of the block copolymers in the above thermoplastic elastomer compositions is hydrogenated have been further widely used as a substitute for vulcanized rubber because these compositions are improved in thermal aging resistance (thermal stability) and weather resistance.

However, the thermoplastic elastomer compositions using these hydrogenated block copolymers have a problem that there is still room to be improved in rubber properties, for example, oil resistance, a heat pressing deformation rate (compression set), and rubber elasticity at high temperatures.

Therefore, a crosslinked composition obtained by crosslinking a hydrogenated derivative of the above block copolymers is proposed as a composition in which the above characteristics are improved (for example, refer to Patent Literatures 1 to 5).

Many thermoplastic elastomer compositions obtained by dynamically crosslinking an olefin resin and an olefin copolymer rubber are also known.

For example, there are disclosed an elastomer composition obtained by dynamically crosslinking an ethylene copolymer resin such as an ethylene-vinylacetate copolymer and a rubber such as a halogenated butyl rubber (for example, refer to Patent Literature 6), an elastomer composition containing an EPDM rubber (ethylene-propylene-diene rubber) which is dynamically vulcanized in the presence of an ethylene copolymer resin such as an ethylene-vinylacetate copolymer (for example, refer to Patent Literature 7), an elastomer composition containing a halogenated butyl rubber or the like which is dynamically vulcanized in the presence of an ethylene-hexene copolymer and an ethylene-butene copolymer (for example, refer to Patent Literature 8), a composition containing a thermoplastic elastomer obtained by vulcanizing a mixture of an α-monoolefin copolymer rubber such as EPDM and crystalline polypropylene or the like and a low density ethylene-α-olefin copolymer (for example, refer to Patent Literature 9), a molded article obtained by blending a vulcanized EPDM and a crystalline ethylene polymer followed by free radical crosslinking treatment (for example, refer to Patent Literature 10), a composition containing a thermoplastic elastomer obtained by vulcanizing a mixture of EPDM and crystalline polypropylene, high density polyethylene, and low density polyethylene (for example, refer to Patent Literature 11), and an elastomer obtained by crosslinking treatment of a mixture of a crosslinkable rubber such as a terpolymer rubber, a thermoplastic resin such as polypropylene, and a highly fluid linear polyolefin processing additive (for example, refer to Patent Literature 12).

Further, there is proposed a thermoplastic elastomer composition which is excellent in compression set and molding processability in a high temperature region, flexible, and free from oil bleeding by obtained using an olefinic elastomer and a saturated styrenic elastomer (SEEPS or the like) in combination (for example, refer to Patent Literature 13).

CITATION LIST

Patent Literature

Patent Literature 1: Japanese Patent Laid-Open No. S59-6236
Patent Literature 2: Japanese Patent Laid-Open No. S63-57662
Patent Literature 3: Japanese Patent Publication No. H03-49927
Patent Literature 4: Japanese Patent Publication No. H03-11291
Patent Literature 5: Japanese Patent Publication No. H06-13628
Patent Literature 6: Japanese Patent Publication No. S61-26641
Patent Literature 7: Japanese Patent Laid-Open No. H02-113046
Patent Literature 8: Japanese Patent Laid-Open No. H03-17143
Patent Literature 9: Japanese Patent Laid-Open No. H03
Patent Literature 10: Japanese Patent Laid-Open No. H01-132643
Patent Literature 11: Japanese Patent Laid-Open No. H02-255733
Patent Literature 12: Japanese Patent Laid-Open No. 2002-220493
Patent Literature 13: Japanese Patent No. 4231367

SUMMARY OF INVENTION

Technical Problems to be Solved by the Invention

However, the crosslinked compositions of hydrogenated block copolymers disclosed in the above Patent Literatures 1 to 5 have such problems that the heat resistance on compression set under a high temperature of 100° C. or higher is still insufficient, and mechanical strength is liable to decrease and does not reach the performance level required in the vulcanized rubber application.

The compositions disclosed in the above Patent Literatures 6 to 12 also have such problems that the compression set under high temperatures is poor, and the heat resistance on compression set under high temperatures for a short period of time and a long period of time does not reach the performance level required in the vulcanized rubber application.

Further, the olefinic elastomers contained in the compositions disclosed in the above Patent Literatures 6 to 12 have low oil retention properties, limiting the hardness of the compositions to 50 to 90 A; and when a rubber softener is added to the olefinic elastomers so as to obtain flexibility of the compositions, the bleeding of the softener from a molded article will be significant. Therefore, there is an inconvenience that a composition having a flexibility of 50 A or less has poor extrusion and injection moldability and cannot be used in the applications requiring flexibility.

Furthermore, the crosslinked composition in which an olefinic elastomer component and a styrenic elastomer component are used in combination as disclosed in Patent Literature 13 has a problem that the difference between the crosslinking reaction rate of the olefinic component having an unsaturated bond and that of the saturated styrenic component is so large that crosslinking unevenness, rough surface and poor appearance of the crosslinked composition, and reduction in mechanical properties, compression set, and the like may occur.

Therefore, in view of the problems of prior art as described above, it is an object of the present invention to provide a crosslinked composition excellent in flexibility, heat resistance (compression set and softening point under high temperatures), and mechanical strength, and also excellent in molding processability.

Means for Solving the Problems

As a result of intensive research to solve the above problems of prior art, the present inventors have completed the present invention by finding that the problems of prior art can be solved by a crosslinked composition comprising a vinyl aromatic copolymer rubber (I) having a specific block structure, an ethylenic copolymer rubber (II), an olefinic resin (III), and a crosslinking agent (IV).

Specifically, the present invention is as described below.

[1]

A crosslinked composition obtained by crosslinking a composition, comprising:

1 to 99 parts by mass of a vinyl aromatic copolymer rubber (I) comprising 5 to 70% by mass of a vinyl aromatic monomer unit and 0.1 to 30% by mass of a conjugated diene monomer unit and having one or more tan δ peak temperatures between 75° C. and 125° C. and having one or more tan δ peak temperatures between −70° C. and −25° C. as obtained by dynamic viscoelasticity measurement (1 Hz);

99 to 1 parts by mass of an ethylenic copolymer rubber (II);

10 to 100 parts by mass of an olefinic resin (III) based on 100 parts by mass of a total amount of the vinyl aromatic copolymer rubber (I) and the ethylenic copolymer rubber (II); and 0.01 to 50 parts by mass of a crosslinking agent (IV) based on 100 parts by mass of the total amount of the vinyl aromatic copolymer rubber (I) and the ethylenic copolymer rubber (II).

[2]

The crosslinked composition according to [1], wherein the vinyl aromatic copolymer rubber (I) has a conjugated diene monomer block at an end.

[3]

The crosslinked composition according to [1] or [2], wherein the vinyl aromatic copolymer rubber (I) is a hydrogenated product of a vinyl aromatic block copolymer comprising a vinyl aromatic monomer unit and a conjugated diene monomer unit.

[4]

The crosslinked composition according to any one of [1] to [3], further comprising 1 to 300 parts by mass of a rubber softener (V) based on 100 parts by mass of the total amount of the vinyl aromatic copolymer rubber (I) and the ethylenic copolymer rubber (II).

[5]

The crosslinked composition according to any one of [1] to [4], wherein the ethylenic copolymer rubber (II) is an ethylene-propylene-non-conjugated diene copolymer rubber (EPDM).

[6]

The crosslinked composition according to any one of [1] to [5], wherein the olefinic resin (III) is polypropylene.

[7]

The crosslinked composition according to any one of [1] to [6], wherein a softening point is 135° C. or higher.

[8]

The crosslinked composition according to any one of [1] to [7], wherein a proportion (degree of crosslinking) of a total mass of a crosslinked product of the vinyl aromatic copolymer rubber (I) and a crosslinked product of the ethylenic copolymer rubber (II) based on the total mass of the vinyl aromatic copolymer rubber (I) and the ethylenic copolymer rubber (II) is 90% or more.

[9]

A method for producing a crosslinked composition, comprising: a step of mixing a composition and dynamically crosslinking under a melting condition the composition comprising, 1 to 99 parts by mass of a vinyl aromatic copolymer rubber (I) comprising 5 to 70% by mass of a vinyl aromatic monomer unit and 0.1 to 30% by mass of a conjugated diene monomer unit and having one or more tan δ peak temperatures between 75° C. and 125° C. and having one or more tan δ peak temperatures between −70° C. and −25° C. as obtained by dynamic viscoelasticity measurement (1 Hz);

99 to 1 parts by mass of an ethylenic copolymer rubber (II);

10 to 100 parts by mass of an olefinic resin (III) based on 100 parts by mass of a total amount of the vinyl aromatic copolymer rubber (I) and the ethylenic copolymer rubber (II); and 0.01 to 50 parts by mass of a crosslinking agent (IV) based on 100 parts by mass of the total amount of the vinyl aromatic copolymer rubber (I) and the ethylenic copolymer rubber (II).

[10]

A molded product obtained by molding the crosslinked composition according to any one of [1] to [8].

[11]

A crosslinked composition comprising a vinyl aromatic copolymer rubber, an ethylenic copolymer rubber, an olefinic resin, and a crosslinking agent, wherein, in a range of a hardness (H: Shore A hardness) of 60 to 90, a relation between a softening point (S (° C.)) and hardness (H: Shore A hardness) satisfies the following condition:

$$S \geq (1/2) \times H + 105.$$

Advantageous Effects of Invention

The present invention provides a crosslinked composition excellent in flexibility, heat resistance, and mechanical strength, and also excellent in molding processability.

MODE FOR CARRYING OUT THE INVENTION

Hereinafter, the mode for performing the present invention (hereinafter, simply referred to as "the present embodiment") will be described in detail. The present embodiment to be described below is for illustration purposes to describe the present invention and not intended to limit the present invention to the following contents. The present invention can be implemented by suitably modifying the contents within the scope of the present invention.

[Crosslinked Composition]

The crosslinked composition of the present embodiment is a crosslinked composition obtained by crosslinking a composition, comprising:

1 to 99 parts by mass of a vinyl aromatic copolymer rubber (I) comprising 5 to 70% by mass of a vinyl aromatic monomer unit and 0.1 to 30% by mass of a conjugated diene monomer unit and having one or more tan δ peak temperatures between 75° C. and 125° C. and having one or more tan δ peak temperatures between −70° C. and −25° C. as obtained by dynamic viscoelasticity measurement (1 Hz);

99 to 1 parts by mass of an ethylenic copolymer rubber (II);

10 to 100 parts by mass of an olefinic resin (III) based on 100 parts by mass of a total amount of the vinyl aromatic copolymer rubber (I) and the ethylenic copolymer rubber (II); and 0.01 to 50 parts by mass of a crosslinking agent (IV) based on 100 parts by mass of the total amount of the vinyl aromatic copolymer rubber (I) and the ethylenic copolymer rubber (II).

In the present specification, the nomenclature of each monomer unit constituting a polymer follows the nomenclature of a monomer from which the monomer unit is derived.

For example, a "vinyl aromatic monomer unit" means a constitutional unit of a polymer produced as a result of polymerization of a vinyl aromatic compound which is a monomer. The structure is a molecular structure in which 2 carbons of a substituted ethylene group derived from a substituted vinyl group serve as a binding site.

Further, a "conjugated diene monomer unit" means a constitutional unit of a polymer produced as a result of polymerization of a conjugated diene which is a monomer. The structure is a molecular structure in which 2 carbons of olefin derived from a conjugated diene monomer serve as a binding site.

(Vinyl Aromatic Copolymer Rubber (I))

The vinyl aromatic copolymer rubber (I) comprises 5 to 70% by mass of a vinyl aromatic monomer unit and 0.1 to 30% by mass of a conjugated diene monomer unit.

The vinyl aromatic copolymer rubber (I) is not particularly limited to a specific mode as long as it comprises 5 to 70% by mass of a vinyl aromatic monomer unit and 0.1 to 30% by mass of a conjugated diene monomer unit.

The content of the vinyl aromatic monomer unit in the vinyl aromatic copolymer rubber (I) is from 5% by mass to 70% by mass based on the total mass of the vinyl aromatic copolymer rubber (I) from the viewpoint of the mechanical properties and rubber properties of the vinyl aromatic copolymer rubber (I). Specifically, the content is 70% by mass or less from the viewpoint of the flexibility and rubber properties of the vinyl aromatic copolymer rubber (I) and 5% by mass or more from the viewpoint of the handleability (non-tackiness), productivity, and processability of the vinyl aromatic copolymer rubber (I) and the crosslinked composition of the present embodiment.

The content of the vinyl aromatic monomer unit in the vinyl aromatic copolymer rubber (I) is more preferably in the range of 10% by mass to 60% by mass, further preferably in the range of 12% by mass to 50% by mass, further more preferably in the range of 15% by mass to 40% by mass.

The vinyl aromatic copolymer rubber (I) is preferably a hydrogenated product of a vinyl aromatic copolymer comprising a vinyl aromatic monomer unit and a conjugated diene monomer unit from the viewpoint of oxidation stability, thermal stability, productivity, and processability.

Further, the vinyl aromatic copolymer rubber (I) is preferably a hydrogenated product of a vinyl aromatic block copolymer comprising a polymer block A comprising as a main component a vinyl aromatic monomer unit, at least one polymer block B comprising as a main component a conjugated diene monomer unit having 5 or more carbon atoms, and at least one polymer block C comprising as a main component a conjugated diene monomer unit having 4 or more carbon atoms which is different from the conjugated diene monomer unit constituting the polymer block B, and having at least one unsaturated block at an end from the viewpoint of the heat resistance and mechanical properties of the crosslinked composition of the present embodiment.

Furthermore, the vinyl aromatic copolymer rubber (I) preferably includes a structure comprising a polymer block A comprising as a main component a vinyl aromatic monomer unit and at least one polymer block C comprising as a main component a conjugated diene monomer unit having 4 or more carbon atoms which is different from the conjugated diene monomer unit constituting the polymer block B. Note that the copolymer may be suitably hydrogenated also in this case.

In the present specification, "comprising as a main component" means containing 60% by mass or more, preferably 70% by mass or more, more preferably 80% by mass or more of a predetermined monomer unit in a predetermined block. For example, in the case of "a polymer block comprising as a main component an A unit", the polymer block contains 60% by mass or more of the A (monomer) unit.

Further, in the present specification, "an end" includes an end of a polymer chain and, when the polymer chain has a polymer block A at the end, also includes an internal adjacent part to the polymer block A. For example, when the vinyl aromatic copolymer rubber (I) has a polymer block B as an unsaturated block and has a structure of A-B-C-B-A, "the polymer block B is present at an end." That is, in the case of this example, it is meant that the polymer block B is adjacent to the polymer block A which is a hard segment, or the end block is a random copolymer block (A/B) comprising as main components a conjugated diene monomer unit having 5 or more carbon atoms and a vinyl aromatic monomer unit.

As described above, the polymer block B is a polymer block comprising as a main component a conjugated diene monomer unit having 5 or more carbon atoms and may be a random copolymer of a plurality of conjugated diene monomer units each having 5 or more carbon atoms, and these conjugated diene monomer units may be uniformly distributed in the polymer block B or may be non-uniformly distributed (for example, in a tapered shape) therein.

A plurality of uniformly distributed portions and/or non-uniformly distributed portions may coexist in the polymer block B.

The polymer block B is more preferably a block copolymer of 5 or more conjugated diene monomer units from the viewpoint of the compression set of the crosslinked composition of the present embodiment.

When the vinyl aromatic copolymer rubber (I) is "a hydrogenated product of a vinyl aromatic block copolymer comprising a polymer block A comprising as a main component a vinyl aromatic monomer unit, at least one polymer block B comprising as a main component a conjugated diene monomer unit having 5 or more carbon atoms, and at least one polymer block C comprising as a main component a conjugated diene monomer unit having 4 or more carbon atoms which is different from the conjugated diene monomer unit constituting the polymer block B, and having at least one unsaturated block at an end" as described above, the content of the polymer block B in the vinyl aromatic copolymer rubber (I) is preferably from 0.1% by mass to 20% by mass based on the total mass of the vinyl aromatic copolymer rubber (I).

Since the polymer block B is a block containing unsaturated bonds, the content of the polymer block B is preferably 20% by mass or less from the viewpoint of oxidation stability, thermal stability, productivity, and processability, preferably 0.1% by mass or more from the viewpoint of crosslinking reactivity, more preferably in the range of 0.5% by mass to 15% by mass, and further preferably in the range of 1% by mass to 10% by mass, based on the total mass of the vinyl aromatic copolymer rubber (I).

The polymer block C is a polymer block comprising as a main component a conjugated diene monomer unit having 4 or more carbon atoms which is different from the conjugated diene monomer unit constituting the polymer block B and may be a random copolymer of a plurality of conjugated diene monomer units each having 4 or more carbon atoms, and these conjugated diene monomer units may be uniformly distributed in the polymer block C or may be non-uniformly distributed (for example, in a tapered shape) therein.

A plurality of uniformly distributed portions and/or non-uniformly distributed portions may coexist in the polymer block B.

The polymer block C is more preferably a block copolymer of 4 or more conjugated diene monomer units from the viewpoint of compression set.

The content of the polymer block C in the vinyl aromatic copolymer rubber (I) is preferably 10 to 85% by mass from the viewpoint of oxidation stability, thermal stability, productivity, and processability, more preferably 25 to 85% by mass from the viewpoint of productivity and processability, based on the total mass of the vinyl aromatic copolymer rubber (I) in the state before hydrogenation.

When the vinyl aromatic copolymer rubber (I) is a hydrogenated product of a vinyl aromatic block copolymer comprising the polymer block A, polymer block B, and polymer block C as described above, the polymer block C has a portion in which an unsaturated bond disappears by hydrogenation. Therefore, the amount of the polymer block C contained in the vinyl aromatic block copolymer (I) is about 0.1 to 1.0% by mass after hydrogenation.

When the vinyl aromatic copolymer rubber (I) is a hydrogenated product of a vinyl aromatic block copolymer comprising the polymer block A, polymer block B, and polymer block C, the degree of hydrogenation of the polymer block C is preferably 80% or more, more preferably 85% or more, further preferably 90% or more, and further more preferably 95% or more, from the viewpoint of oxidation stability, thermal stability, and elongation at break.

Further, when the vinyl aromatic copolymer rubber (I) includes a structure comprising a polymer block A comprising as a main component a vinyl aromatic monomer unit and at least one polymer block C comprising as a main component a conjugated diene monomer unit having 4 or more carbon atoms which is different from the conjugated diene monomer unit constituting the polymer block B, in which the polymer block B is not contained, that is, when the vinyl aromatic copolymer rubber (I) is composed only of a polymer block A and a polymer block C, as described above, the degree of hydrogenation of the polymer block C is preferably 60 to 85%, more preferably 65 to 80%.

When the vinyl aromatic copolymer rubber (I) is a hydrogenated product of a vinyl aromatic block copolymer comprising a vinyl aromatic monomer unit and a conjugated diene monomer unit, examples of the vinyl aromatic block copolymer in the state before hydrogenation of the vinyl aromatic copolymer rubber (I) include a linear block copolymer represented by the general formula: H—(C—H)$_n$, a linear block copolymer represented by the general formula: [(H—C)$_k$]$_m$—X, [H—(C—H)$_k$]$_m$—X, and a radial block copolymer.

In the above general formulas, H represents any one selected from the group consisting of a homoblock of A, a homoblock of B, a block copolymer of A-B or B-A, and a random copolymer block (A/B) comprising as main components a conjugated diene monomer unit having 5 or more carbon atoms and a vinyl aromatic monomer unit.

A plurality of H in the formulas may be the same or different.

For example, a block structure of the A-B-C-A-B type is also included.

Preferably, n and k are each an integer of 1 to 5, and m is an integer of 2 to 6.

X represents a residue of a coupling agent or a residue of a polyfunctional initiator.

A plurality of polymer blocks A and polymer blocks B present in the block copolymer each may have the same or different structure such as molecular weight and composition.

The mass ratio of the polymer block A comprising as a main component a vinyl aromatic monomer unit to the polymer block B contained in the polymer block H is not particularly limited. However, the percentage of the polymer block A is preferably 60% by mass or more based on the polymer block H, that is, the percentage of the polymer block B is preferably 40% by mass or less, from the viewpoint of stickiness, polymer fusion (blocking), productivity, and compression set of the vinyl aromatic copolymer rubber (I). Further, the percentage of the polymer block A is preferably 99% by mass or less, that is, the percentage of the polymer block B is preferably 1% by mass or more, in terms of a larger number of unsaturated groups and higher crosslinking reactivity of the vinyl aromatic copolymer rubber (I).

The ratio (B/H) of the polymer block B to the polymer block H is more preferably 5 to 25% by mass, further preferably 7 to 20% by mass. This is because the polymer block B has a feature that it is hardly hydrogenated.

In addition, H is preferably a block copolymer of A-B or B-A in terms of compression set.

When the ratio of the polymer block B is in the above numerical value range, the crosslinked composition of the present embodiment can maintain satisfactory characteristics over a long period of time and provide high heat resistance.

The vinyl aromatic copolymer rubber (I) preferably has at least one, more preferably at least two unsaturated blocks at an end thereof.

Note that the "unsaturated block" refers to a polymer block having an olefinic unsaturated double bond, preferably a conjugated diene monomer block, and mainly means the polymer block B (the polymer block comprising as a main component a conjugated diene monomer unit having 5 or more carbon atoms) as described above. The polymer block B preferably has a lower degree of hydrogenation of double bonds of the conjugated diene monomer units which are olefinic unsaturated double bonds than the polymer block C, and preferably has a higher proportion of unsaturated bonds in the block than the polymer block C.

Therefore, when a conjugated diene monomer unit to be used in the polymer block B is selected, it is preferred to select a conjugated diene monomer unit having a lower hydrogenation rate than a conjugated diene monomer unit to be used in the polymer block C.

When the vinyl aromatic copolymer rubber (I) has a conjugated diene monomer block at an end, crosslinking is performed at an end of a molecular chain, providing excellent flexibility, heat resistance, mechanical strength, and molding processability to the crosslinked composition of the present embodiment.

When the polymer block H is a random copolymer block (A/B) comprising as main components a conjugated diene monomer unit having 5 or more carbon atoms and a vinyl aromatic monomer unit, this random copolymer block is also included in the "unsaturated block."

Here, two or more monomer units may be uniformly distributed or may be non-uniformly distributed (for example, in a tapered shape) in the "random" copolymer block, The vinyl aromatic copolymer rubber (I) preferably has at least one unsaturated block between a hard segment at an end and an internal soft segment.

For example, when the vinyl aromatic copolymer rubber (I) is a hydrogenated block copolymer obtained by hydrogenating a non-hydrogenated block copolymer having a structure having at both ends polymer blocks A each comprising as a main component a vinyl aromatic monomer unit as a hard segment and having in the internal adjacent parts thereof, that is, between the hard segment and an internal soft segment, polymer blocks B each comprising as a main component a conjugated diene monomer unit having 5 or more carbon atoms which is an unsaturated block, micro phase separation becomes clearer, and the polymer block A comprising as a main component a vinyl aromatic monomer unit has a stronger cohesion. As a result, a sticky feeling and compression set of the vinyl aromatic copolymer rubber (I) can be preferably improved.

When the vinyl aromatic copolymer rubber (I) has a structure of a type that contains polymer blocks B each comprising as a main component a conjugated diene monomer unit having 5 or more carbon atoms not only at both ends but inside the molecular chain thereof, the crosslinked composition of the present embodiment preferably has improved oil resistance and compression set.

Examples of the vinyl aromatic hydrocarbons which constitute the vinyl aromatic copolymer rubber (I) include, but are not limited to, styrene, o-methylstyrene, p-methylstyrene, p-tert-butylstyrene, 1,3-dimethylstyrene, α-methylstyrene, vinylnaphthalene, and vinylanthracene.

These may be used singly or in combination of two or more. Styrene is particularly preferred from the viewpoint of industrial availability and cost.

The conjugated diene which constitutes the vinyl aromatic copolymer rubber (I) is a diolefin having a pair of conjugate double bonds.

Examples of the conjugated dienes contained in the polymer block B as described above include, but are not limited to, isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene, and 1,3-cyclohexadiene.

These may be used singly or in combination of two or more. Isoprene and 1,3-cyclohexadiene are preferred from the viewpoint that the polymer block B tends not to be hydrogenated under the conditions where the polymer block C is hydrogenated.

Moreover, examples of the conjugated dienes contained in the polymer block C as described above include, but are not limited to, 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, and 1,3-cyclohexadiene.

These may be used singly or in combination of two or more.

1,3-Butadiene is particularly preferred from the viewpoint of the ease of hydrogenation, and the polymer block C is preferably a conjugated diene homoblock from the viewpoint of compression set.

The number of carbon atoms of the conjugated dienes used in polymer blocks B and C is preferably 15 or less from the viewpoint of industrial availability and cost.

All the monomer species having anionic polymerizability are applicable to the remaining components other than the components used as "main components", such as a vinyl aromatic monomer unit which constitutes the block A and a conjugated diene monomer unit which constitutes the block B and block C, which are contained in the polymer block which constitutes the vinyl aromatic copolymer rubber (I).

When a vinyl aromatic copolymer rubber (I) having a structure that has an unsaturated block, that is, a polymer block having an olefinic unsaturated double bond at an end as described above, preferably a conjugated diene monomer block, mainly the above-described polymer block B (polymer block comprising as a main component a conjugated diene monomer unit having 5 or more carbon atoms) is used as the vinyl aromatic copolymer rubber (I) constituting the crosslinked composition of the present embodiment, very excellent heat resistance is exhibited. However, the vinyl aromatic copolymer rubber (I) is not limited to such a special structure.

As described above, the vinyl aromatic copolymer rubber (I) comprises 5 to 70% by mass of a vinyl aromatic monomer unit and 0.1 to 30% by mass of a conjugated diene monomer unit. The content of the conjugated diene monomer unit can be adjusted by hydrogenation, and such a hydrogenated product can be preferably used as the vinyl aromatic copolymer rubber (I).

That is, the crosslinked composition of the present embodiment can obtain excellent heat resistance and mechanical strength by using a hydrogenated product of a block copolymer comprising 5 to 70% by mass of a vinyl aromatic monomer unit and a conjugated diene monomer unit as the vinyl aromatic copolymer rubber (I), the hydrogenated product containing 0.1 to 30% by mass of the conjugated diene monomer unit remaining without being hydrogenated.

Moreover, the hydrogenated product of a block copolymer comprising 5 to 70% by mass of a vinyl aromatic monomer unit and a conjugated diene monomer unit, and also containing 0.1 to 30% by mass of the conjugated diene monomer unit remaining without being hydrogenated, is advantageous from the viewpoint of the ease of production and cost.

Specific examples of the vinyl aromatic copolymer rubber (I) having a structure comprising 5 to 70% by mass of a vinyl aromatic monomer unit and 0.1 to 30% by mass of a conjugated diene monomer unit in which the content of the conjugated diene monomer unit is adjusted by hydrogenation include hydrogenated products of a block copolymer of styrene and butadiene (SBR), a styrene-butadiene-styrene block copolymer (SBS), and a styrene-isoprene-styrene block copolymer (SIS), in which 0.1 to 30% by mass of the conjugated diene is left in a non-hydrogenated state.

<Tan δ Peak Temperature in Dynamic Viscoelasticity Measurement>

The vinyl aromatic copolymer rubber (I) has one or more tan δ peak temperatures in a high temperature region of 75° C. to 125° C. and one or more tan δ peak temperatures in a low temperature region of −70° C. to −25° C., as obtained by dynamic viscoelasticity measurement (measurement frequency: 1 Hz).

The tan δ peak temperature in a high temperature region is 75° C. to 125° C., preferably 80° C. to 110° C., more preferably 90 to 105° C.

On the other hand, the tan δ peak temperature in a low temperature region is −70° C. to −25° C., preferably −60° C. to −30° C., more preferably −55° C. to −35° C.

A crosslinked composition with good rubber elasticity is obtained by setting the tan δ peak temperature to the above ranges.

The tan δ peak can be controlled by incorporating a random copolymer block of a hydrogenated conjugated diene and/or alkylene and a vinyl aromatic compound into the crosslinked composition of the present embodiment or by adjusting the content and distribution of vinyl content derived from a conjugated diene before hydrogenation, the amount of hydrogenation of the conjugated diene, the amount, distribution, and molecular weight distribution of α-olefin having 3 or more carbon atoms derived from alkylene, and the content of a block comprising as a main component a vinyl aromatic compound.

The tan δ peak temperature of the vinyl aromatic copolymer rubber (I) can be measured by the method described in Examples to be described below.

<Weight Average Molecular Weight>

The weight-average molecular weight of the vinyl aromatic copolymer rubber (I) can be measured in terms of polystyrene using GPC. The weight-average molecular weight is preferably 5,000 to 2,000,000, more preferably 10,000 to 1,000,000, further preferably 30,000 to 500,000, from the viewpoint of the balance of the productivity, processability and mechanical strength, and compression set of the crosslinked composition of the present embodiment.

The molecular weight distribution (Mw/Mn) (ratio of the weight-average molecular weight (Mw) to the number average molecular weight (Mn)) of the vinyl aromatic copolymer rubber (I) is preferably 10 or less, more preferably 1.01 to 5, further preferably 1.01 to 2, from the viewpoint of the balance of the processability and mechanical strength.

Note that, with respect to the weight-average molecular weight, the measurement by gel permeation chromatography (GPC) is performed, and the resulting molecular weight of the peak in the chromatogram is converted using a calibration curve determined from the measurement of commercial standard polystyrene (prepared using a peak molecular weight of the standard polystyrene) to determine the weight-average molecular weight.

The molecular weight distribution of the hydrogenated block copolymer can be similarly determined from the measurement by GPC.

<Microstructure>

The microstructure (the percentage of cis- and trans-vinyl) of the conjugated diene monomer unit portion in the block copolymer in the state before hydrogenation of the above vinyl aromatic copolymer rubber (I) can be arbitrarily changed by using a polar compound or the like. When 1,3-butadiene is used as the conjugated diene, the 1,2-vinyl bond content is generally 5 to 90% by mass, and when isoprene is used as the conjugated diene, the 3,4-vinyl bond content is generally 3 to 80% by mass.

However, from the viewpoint of the productivity, when 1,3-butadiene is used as the conjugated diene, the 1,2-vinyl bond content is preferably 10 to 80% by mass, more preferably 20 to 75% by mass, further preferably 25 to 75% by mass.

When isoprene is used as the conjugated diene, the 3,4-vinyl bond content is preferably 5 to 70% by mass.

The content of the vinyl aromatic monomer unit in the above vinyl aromatic copolymer rubber (I) can be determined by using an ultraviolet spectrophotometer or the like.

The vinyl bond content based on the conjugated diene monomer unit and the degree of hydrogenation of the polymer block which constitutes the vinyl aromatic copolymer rubber (I) can be determined by using a nuclear magnetic resonance spectrometer (NMR).

The molecular weight of a homopolymer block of the vinyl aromatic monomer unit can be determined by measuring, with an ultraviolet spectrophotometer and GPC, the components of the homopolymer block (here, the components having a polymerization degree of 30 or less are excluded) of the vinyl aromatic monomer unit obtained by decomposing a block copolymer before hydrogenation, according to a method (I. M. KOLTHOFF, et al., J. Polym. Sci. 1, 429 (1946)) of oxidatively decomposing the block copolymer by di-tert-butyl hydroperoxide using osmium tetroxide as a catalyst. The content can be determined by an ultraviolet spectrophotometer or the like.

(Polymerization Method of (I))

A known method is applicable to the polymerization method for producing the above vinyl aromatic copolymer rubber (I), and for example, those methods described in Japanese Patent Publication Nos. S36-19286, S43-17979, S46-32415, S49-36957, S48-2423, S48-4106, S56-28925, and S51-49567, and Japanese Patent Laid-Open Nos. S59-166518 and S60-186577 are applicable.

(Ethylenic Copolymer Rubber (II))

Examples of the ethylenic copolymer rubber (II) which constitutes the crosslinked composition of the present embodiment include, but are not limited to, an elastomer in which ethylene is copolymerized with α-olefin such as propylene, 1-butene, and 1-pentene and an ethylenic copolymer rubber in which these monomers are copolymerized with a non-conjugated diene.

Examples of the non-conjugated diene include, but are not limited to, 5-ethylidene-2-norbornene (ENB), 1,4-hexadiene, 5-methylene-2-norbornene (MNB), 1,6-octadiene, 5-methyl-1,4-hexadiene, 3,7-dimethyl-1,6-octadiene, 1,3-cyclopentadiene, 1,4-cyclohexadiene, tetrahydroindene, methyl tetrahydroindene, dicyclopentadiene, 5-isopropylidene-2-norbornene, 5-vinyl-norbornene, dicyclooctadiene, and methylene norbornene.

Examples of the ethylenic copolymer rubber (II) include, but are not limited to, an ethylene-propylene copolymer rubber, an ethylene-propylene-non-conjugated diene copolymer rubber, an ethylene-1-butene copolymer rubber, an ethylene-1-butene-non-conjugated diene copolymer rubber, and an ethylene-propylene-1-butene copolymer rubber.

Among them, an ethylene-propylene-non-conjugated diene copolymer rubber (EPDM) is preferred from the viewpoint of crosslinkability.

Further, the ethylene content of the ethylenic copolymer rubber (II) is preferably in the range of 40 to 80% by mass, more preferably in the range of 50 to 75% by mass, further preferably in the range of 60 to 75% by mass. By setting the above range, the balance between the ease of production and the compression set and tensile strength at high temperatures is good, which is very satisfactory.

Further, the non-conjugated diene content of the ethylenic copolymer rubber (II) is preferably 0.5 to 8% by mass, more preferably 4 to 8% by mass.

The crosslinked composition of the present embodiment can obtain the improvement effect of the compression set by setting the non-conjugated diene content of the ethylenic copolymer rubber (II) to 0.5% by mass or more. Further, handleability is improved by setting the non-conjugated diene content to 8% by mass or less.

The Mooney viscosity $M^{1+4}$ (125° C.) of the ethylenic copolymer rubber (II): (Preheating is performed for 1 minute followed by measurement for 4 minutes. Measurement temperature is 125° C.) is preferably 10 to 180, more preferably 20 to 150.

When the Mooney viscosity $ML^{1+4}$ (125° C.) of the ethylenic copolymer rubber (II) is 10 or more, the crosslinked composition of the present embodiment has good compression set, and when the viscosity is 180 or less, the composition has good moldability.

The blending amount of the ethylenic copolymer rubber (II) is 1 to 99 parts by mass when the amount of the vinyl aromatic copolymer rubber (I)+the ethylenic copolymer rubber (II)=100 parts by mass.

When the vinyl aromatic copolymer rubber (I) and the ethylenic copolymer rubber (II) are used in combination, crosslinked rubber particles formed by dynamic crosslinking can be effectively micro-dispersed, thereby improving mechanical strength and compression set.

The smaller the size of the crosslinked rubber particles dispersed in the matrix formed by olefinic resin, the higher the tendency of improvement in compression set and mechanical strength.

The size of dispersed crosslinked rubber particles in the crosslinked composition of the present embodiment is preferably 1 μm or less, more preferably 0.5 μm or less, further preferably 0.3 μm or less, and further more preferably 0.1 μm or less.

Moreover, in the present embodiment, since the vinyl aromatic copolymer rubber (I) contains 0.1 to 30% by mass of a conjugated diene monomer unit, it has a crosslinking rate closer to that of the ethylenic copolymer rubber (II). Thus, the effect of suppressing crosslinking unevenness, rough surface and poor appearance of the crosslinked composition, and reduction in mechanical properties, compression set, and the like can be achieved by suitably controlling the crosslinking rate of both rubbers.

(Olefinic Resin (III))

The olefinic resin (III) contained in the crosslinked composition of the present embodiment is preferably a crystalline olefinic resin.

The blending amount of the olefinic resin (III) is 10 to 100 parts by mass, preferably 15 to 80 parts by mass, more preferably 20 to 60 parts by mass, based on 100 parts by mass of the (I)+the (II).

When the content of the olefinic resin (III) is 10 parts by mass or more, the crosslinked composition has sufficient thermoplasticity and good molding processability.

On the other hand, when the content is 100 parts by mass or less, the crosslinked composition has sufficient flexibility.

The olefinic resin (III) contained in the crosslinked composition of the present embodiment includes a crystalline homopolymer of ethylene or propylene and a crystalline copolymer comprising as main components ethylene and propylene.

Examples of the olefinic resin (III) include, but are not limited to, crystalline ethylenic polymers such as high density polyethylene, low density polyethylene, and an ethylene-butene-1 copolymer, and crystalline propylene polymers such as polypropylene, particularly isotactic polypropylene, a propylene-ethylene copolymer, and a propylene-butene-1 copolymer. Among them, a propylene resin is preferred, and polypropylene is preferred from the viewpoint of heat resistance.

(Crosslinking Agent (IV))

The blending amount of the crosslinking agent (IV) to the crosslinked composition of the present embodiment is 0.01 to 50 parts by mass, preferably 0.05 to 40 parts by mass, more preferably 0.1 to 30 parts by mass, based on 100 parts by mass of the (I)+the (II).

When the amount of the crosslinking agent (IV) used is 0.01 parts by mass or more, sufficient crosslinking bond can be formed in the crosslinked composition of the present embodiment, and when the amount is 50 parts by mass or less, bleedout of a rubber softener (V) to be described below, reduction in mechanical properties, and the like can be effectively prevented.

The type of the crosslinking agent (IV) is not particularly limited, but conventionally known crosslinking agents can be used.

Examples of the crosslinking agent (IV) include, but are not limited to, an organic peroxide, a sulfur compound, a phenol resin compound, a quinoid compound, a bismaleimide compound, an isocyanate compound, a thiuram compound, morpholine disulfide, and a hydrosilicone compound. Further, the crosslinking agent can be optionally used in combination with a crosslinking auxiliary such as stearic acid, oleic acid, zinc stearate, and zinc oxide, a co-crosslinking agent, a vulcanization accelerator, and the like.

As the crosslinking auxiliary, conventionally known crosslinking auxiliaries can be used, and examples include polyfunctional methacrylate compounds such as ethylene glycol dimethacrylate, diethylene glycol dimethacrylate, triethylene glycol dimethacrylate, tetraethylene glycol dimethacrylate, polyethylene glycol dimethacrylate having 9 to 14 repeating units of ethylene glycol, trimethylol propane trimethacrylate, allyl methacrylate, 2-methyl-1,8-octanediol dimethacrylate, and 1,9-nonanediol dimethacrylate, polyfunctional acrylate compounds such as polyethylene glycol diacrylate, ethoxylated cyclohexanedimethanol diacrylate, 1,6-hexanediol diacrylate, neopentyl glycol diacrylate, and propylene glycol diacrylate, and polyfunctional vinyl compounds such as vinyl butyrate, vinyl stearate, divinylbenzene, and triallyl cyanurate.

These may be used singly or in combination of two or more.

Uniform and efficient crosslinking reaction can be expected from these compounds.

(Rubber Softener (V))

The crosslinked composition of the present embodiment may further contain 1 to 300 parts by mass of a rubber softener (V) based on 100 parts by mass of the (I)+the (II).

The type of the rubber softener (V) is not particularly limited, and a mineral oil-based softener and/or a synthetic resin-based softener can be used.

The mineral oil-based softener is generally a mixture of an aromatic hydrocarbon and a non-aromatic hydrocarbon (a naphthenic hydrocarbon and a paraffinic hydrocarbon). The mixture in which the number of carbon atoms of a paraffinic hydrocarbon is 50% or more of the total number of carbon atoms is called a paraffinic oil. On the other hand, the mixture in which the number of carbon atoms of a naphthenic hydrocarbon is 30 to 45% of the total number of carbon atoms is called a naphthenic oil, and the mixture in which the number of carbon atoms of an aromatic hydrocarbon is 35% or more of the total number of carbon atoms is called an aromatic oil.

Among them, a rubber softener suitably used in the present invention is a paraffinic oil.

Examples of the compounds which constitute paraffinic oil include, but are not limited to, paraffinic compounds having 4 to 155 carbon atoms, preferably paraffinic compounds having 4 to 50 carbon atoms. Specific examples include n-paraffins (linear saturated hydrocarbons) such as butane, pentane, hexane, heptane, octane, nonane, decane, undecane, dodecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane, triacontane, hentriacontane, dotriacontane, pentatriacontane, hexacontane, and heptacontane; isoparaffins (branched saturated hydrocarbons) such as isobutane, isopentane, neopentane, isohexane, isopentane, neohexane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, 3-methylheptane, 2,2-dimethylhexane, 2,3-dimethylhexane, 2,4-dimethylhexane, 2,5-dimethylhexane, 3,4-dimethylhexane, 2,2,3-trimethylpentane, isooctane, 2,3,4-trimethylpentane, 2,3,3-trimethylpentane, 2,3,4-trimethylpentane, isononane, 2-methylnonane, isodecane, isoundecane, isododecane, isotridecane, isotetradecane, isopentadecane, isooctadecane, isonanodecane, isoeicosane, and 4-ethyl-5-methyloctane; and derivatives of these saturated hydrocarbons.

These paraffinic oils are used as a mixture and preferably liquid at room temperature.

Examples of commercially available paraffinic oils which are liquid at room temperature include, but are not limited to, NA Solvent (isoparaffinic hydrocarbon oil) manufactured by NOF Corporation, PW-90 (n-paraffinic process oil) manufactured by Idemitsu Kosan Co., Ltd., IP-Solvent 2835 (synthetic isoparaffinic hydrocarbon containing 99.8% by mass or more of isoparaffin) manufactured by Idemitsu Petrochemical Co., Ltd, and Neothiozole (n-paraffinic process oil) manufactured by Sanko Chemical Industry Co., Ltd.

Further, a small amount of unsaturated hydrocarbons and derivatives thereof may be present in combination with the non-aromatic hydrocarbons suitable as a component of the rubber softener (V).

Examples of the unsaturated hydrocarbons include, but are not limited to, ethylenic hydrocarbons such as ethylene, propylene, 1-butene, 2-butene, isobutylene, 1-pentene, 2-pentene, 3-methyl-1-butene, 3-methyl-1-butene, 2-methyl-2-butene, 1-hexene, 2,3-dimethyl-2-butene, 1-heptene, 1-octene, 1-nonene, and 1-decene; and acetylenic hydrocarbons such as acetylene, methylacetylene, 1-butyne, 2-butyne, 1-pentyne, 1-hexyne, 1-octyne, 1-nonyne, and 1-decyne.

Examples of the synthetic resin softener include, but are not limited to, polybutene and low molecular weight polybutadiene.

The rubber softener (V) as described above can be arbitrarily added at a proportion of 1 to 300 parts by mass based on 100 parts by mass of the (I)+the (II).

In order to obtain a crosslinked composition excellent in the balance between flexibility and physical properties, the proportion is more preferably 50 to 250 parts by mass, further preferably 100 to 200 parts by mass.

When the proportion is 1 part by mass or more, the crosslinked composition of the present embodiment has sufficient flexibility, and when the proportion is 300 parts by mass or less, bleedout of the softener and reduction in mechanical properties of crosslinked compositions and molded articles can be prevented.

(Other Additives)

The crosslinked composition of the present embodiment may optionally contain other additives.

Examples of other additives include a hardness modifier, and the hardness modifier is not particularly limited as long as it is a conventionally known hardness modifier generally used as a hardness modifier to be contained in a thermoplastic elastomer composition.

Examples of the hardness modifier include, but are not limited to, castor oil and derivatives thereof (such as fatty acids, esters, modified polyols, sulfated oils and salts, and dehydrated products), terpene oil; terpene hydrocarbons, terpene ethers, and the like having 10 carbon atoms, and petroleum resins; resins obtained by copolymerization using as a raw material an unsaturated hydrocarbon obtained in various steps of petroleum refining industry and petrochemical industry, particularly in the decomposition step of naphtha, including an aliphatic petroleum resin using a C5 fraction as a raw material, an aromatic petroleum resin using a C9 fraction as a raw material, an alicyclic petroleum resin using dicyclopentadiene as a raw material, a terpene resin, a copolymerized petroleum resin in which two or more of the above unsaturated hydrocarbons are copolymerized, and a hydrogenated petroleum resin obtained by hydrogenating these resins.

These may be used singly or in combination of two or more.

Further, the crosslinked composition of the present embodiment can contain any filler and flame retardant.

The filler and flame retardant are not particularly limited as long as they are generally used as materials to be contained in a polar resin or a rubber-like polymer.

Examples of the filler include, but are not limited to, inorganic fillers such as silica, calcium carbonate, magnesium carbonate, magnesium hydroxide, aluminum hydroxide, calcium sulfate, barium sulfate, carbon black, glass fiber, glass beads, glass balloons, glass flakes, graphite, titanium oxide, potassium titanate whisker, carbon fiber, alumina, kaolin clay, silicic acid, calcium silicate, quartz, mica, talc, clay, zirconia, potassium titanate, alumina, and metal particles; and organic fillers such as wooden chips, wooden powder, and pulp.

The shape of the filler includes, but is not limited to, a scaly shape, a spherical shape, a granular shape, a powdery shape, and an amorphous shape.

These can be used singly or in combination of two or more.

The flame retardant includes halogenated or phosphorus aromatic compounds containing bromine, phosphorus compounds such as phosphoric ester-based compounds, and metal hydroxides. In recent years, inorganic flame retardants are preferred due to an environmental problem and the like.

Examples of the inorganic flame retardant include, but are not limited to, mainly hydrous metal compounds, such as metal hydroxides such as magnesium hydroxide, aluminum hydroxide, and calcium hydroxide, metal oxides such as zinc borate and barium borate, as well as calcium carbonate, clay, basic magnesium carbonate, and hydrotalcite.

In the present embodiment, metal hydroxides such as magnesium hydroxide and phosphorus compound flame retardants are preferred among the above flame retardants from the viewpoint of improvement in flame retardancy.

These can be used singly or in combination of two or more.

Note that it is also possible to use a flame retardant which exhibits only low flame retardancy by itself but synergistically exhibits higher effect when used in combination with another compound, or a known flame retardant can be used in combination with a known flame retardant auxiliary.

The filler and the flame retardant described above may be previously surface-treated with a surface-treating agent such as a silane coupling agent before they are used.

Further, as described above, the filler and flame retardant may be optionally used in combination of two or more. When they are used in combination, the combination may include, but is not limited to, a combination of filler components, a combination of flame retardant components, and a combination of a filler and a flame retardant.

To the crosslinked composition of the present embodiment, there may be optionally added other additives described in "Chemicals to be Incorporated into Rubber and Plastics" (edited by Rubber Digest Co., Ltd.) and the like or mixtures thereof.

[Physical Properties of Crosslinked Composition]
(Softening Point)

The crosslinked composition of the present embodiment preferably has a softening point of 135° C. or higher, more preferably 140° C. or higher, from the viewpoint of being excellent in heat resistance, long-term heat resistance, and oil resistance.

The softening point can be measured by a method described in Examples to be described below.

(Degree of Crosslinking)

In order to improve the compression set and softening point of the crosslinked composition of the present embodiment, the proportion (degree of crosslinking) of the total mass of a crosslinked product of the vinyl aromatic copolymer rubber (I) and a crosslinked product of the ethylenic copolymer rubber (II) based on the total mass of the vinyl aromatic copolymer rubber (I) and the ethylenic copolymer rubber (II) which constitute the crosslinked composition of the present embodiment is preferably 90% or more, particularly preferably 93% or more.

The degree of crosslinking can be measured by a method described in Examples to be described below.

(Relation Between Softening Point and Hardness)

The crosslinked composition of the present embodiment preferably has a relation in which, in a range of a hardness (H) of 60 to 90, the relation between a softening point (S (° C.)) and hardness (H) satisfies the following condition:

$$S \geq (1/2) \times H + 105.$$

Here, the hardness (H) refers to the Shore A hardness shown in "(II-1) Hardness" described in [II. Characteristics of crosslinked composition] in [Examples] to be described below.

The softening point (S (° C.)) refers to the softening point shown in "(II-4) Softening point" described in [II. Characteristics of crosslinked composition] in [Examples] to be described below.

These measuring methods follow the methods described in [Examples] to be described below.

[Method for Producing Crosslinked Composition]

The method for producing the crosslinked composition of the present embodiment comprises: a step of mixing a composition and dynamically crosslinking under a melting condition, the composition comprising, 1 to 99 parts by mass of a vinyl aromatic copolymer rubber (I) comprising 5 to 70% by mass of a vinyl aromatic monomer unit and 0.1 to 30% by mass of a conjugated diene monomer unit;

99 to 1 parts by mass of an ethylenic copolymer rubber (II);

10 to 100 parts by mass of an olefinic resin (III) based on 100 parts by mass of the (I)+the (II); and 0.01 to 50 parts by mass of a crosslinking agent (IV) based on 100 parts by mass of the (I)+the (II).

The method of dynamic crosslinking is not particularly limited, and a conventionally known method can be used.

Dynamic crosslinking refers to crosslinking treatment in a dynamic state such as melt kneading, and the resulting crosslinked composition has a unique dispersed form that is not observed in the case of non-dynamic crosslinking treatment, which is advantageous for the development of thermoplasticity of a crosslinked composition.

Any of the melt kneading apparatus capable of uniformly mixing each component can be used as an apparatus to be used for dynamic crosslinking, and examples include, but are not limited to, a single-screw extruder, a twin-screw extruder, a kneader, and a Banbury mixer.

Especially, a twin-screw extruder having a large shearing force during kneading and allowing continuous running is preferred.

The "melt kneading" means mixing a composition in a molten state at a temperature of the melting point or above of the composition containing the (I) to (IV). The temperature is preferably 100 to 300° C., more preferably 150 to 250° C.

[Molded Product]

Various molded products can be obtained by molding the crosslinked composition of the present embodiment.

Examples of applicable molding and forming methods include, but are not limited to, extrusion, injection molding, blow molding, pressure forming, vacuum forming, foaming, double layer extrusion, double layer injection molding, high frequency fusion forming, slush molding, and calender molding.

Further, the surface of the molded product can be optionally subjected to printing, coating, and decoration such as embossing for the purpose of improving appearance, weatherability, scratch resistance, and the like.

When performing a surface treatment in order to improve printability, coatability, and the like, the surface treatment method is not particularly limited, and a physical method, a chemical method, and the like can be used. Examples of the surface treatment method include, but are not limited to, corona discharge treatment, ozone treatment, plasma treatment, flame treatment, and acid-alkali treatment. Among these, the corona discharge treatment is preferred from the viewpoint of the ease of operation, cost, continuous treatment being possible, and the like.

[Applications]

The crosslinked composition of the present embodiment can optionally contain various additives for use in various applications. Examples thereof include, but are not limited to, (i) reinforcing filler compounds, (ii) crosslinked products, (iii) foams, (iv) multilayer films and multilayer sheets, (v) building materials, (vi) vibration control soundproof materials, (vii) wire coating materials, (viii) high frequency fusion compositions, (ix) slush molding materials, (x) adhesive compositions, (xi) asphalt compositions, (xii) medical supply materials, and (xiii) automobile materials.

Moreover, examples of the molded products include, but are not limited to, sheets, films, tubes, nonwoven fabrics and fibrous molded products, and synthetic leather. Specifically, they can be used for food packaging materials, medical supply materials, home electronics and parts thereof, electron devices and parts thereof, automobile parts, industrial components, household articles, raw materials for toys, raw materials for footwear, fiber materials, raw materials for adhesives, asphalt modifiers, and the like.

Examples of the automobile parts include, but are not limited to, side malls, grommets, knobs, weather strips, boots, window frames and sealing materials thereof, armrests, door grips, handle grips, console boxes, bedrests, instrument panels, bumpers, spoilers, and storage covers of air bag devices.

Examples of the medical supply include, but are not limited to, blood bags, platelet storage bags, infusion solution (drug solution) bags, bags for artificial dialysis, medical tubing, and catheters.

The molded products can be further used for industrial or foodstuff hoses, cleaner hoses, packing for electric refrigerators, various covering materials for electric wire and others, covering materials for grips, flexible dolls, adhesive tape-, sheet- and film-substrates, surface protective film-substrates and adhesives for the films, adhesives for carpets, films for stretch packaging, thermally shrinkable films, coating materials for coated steel pipes, sealants and the like.

EXAMPLES

The present invention will be described in more detail by way of the following Examples, but the scope of the present invention is not limited thereto.

The measuring methods of physical properties and evaluation methods applied to Examples and Comparative Examples are shown below.

[I. Evaluations of Composition and Structure of Vinyl Aromatic Copolymer Rubber (I)]

(I-1) Styrene Content of Vinyl Aromatic Copolymer Rubber (I)

A non-hydrogenated vinyl aromatic block copolymer ((I) before hydrogenation) was used to measure the styrene content with an ultraviolet spectrophotometer (UV-2450, manufactured by Shimadzu Corp.).

(I-2) Styrene Block Content of Vinyl Aromatic Copolymer Rubber (I)

A non-hydrogenated vinyl aromatic block copolymer ((I) before hydrogenation) was used to measure the styrene block content by the osmium tetroxide oxidative decomposition method as described in I. M. Kolthoff, et al., J. Polym. Sci. 1, 429 (1946).

A solution of 0.1 g of osmic acid in 125 ml of tert-butanol was used for the decomposition of the copolymer.

(I-3) Vinyl Bond Content of Vinyl Aromatic Copolymer Rubber (I)

A non-hydrogenated vinyl aromatic block copolymer ((I) before hydrogenation) was used to measure the vinyl bond content with an infrared spectrophotometer (FT/IR-230, manufactured by JASCO Corp.).

The vinyl bond content of the block copolymer was calculated by the Hampton method.

(I-4) Molecular Weight and Molecular Weight Distribution of Vinyl Aromatic Copolymer Rubber (I)

The molecular weight and molecular weight distribution were measured by GPC (apparatus: HLC-8220, manufactured by Tosoh Corp.; column: TSKgel SuperH-RC×2 columns).

Tetrahydrofuran was used as a solvent.

The measurement was performed at a temperature of 35° C.

The weight-average molecular weight in terms of polystyrene was determined using a calibration curve prepared using commercially available standard polystyrenes whose weight-average molecular weight and number-average molecular weight are known.

Note that the molecular weight distribution is a ratio of the weight-average molecular weight (Mw) to the number-average molecular weight (Mn).

(I-5) Degree of Hydrogenation of Double Bond of Conjugated Diene Monomer Unit and Isoprene Content in Vinyl Aromatic Copolymer Rubber (I)

A hydrogenated block copolymer after hydrogenation was used to measure these values with a nuclear magnetic resonance spectrometer (DPX-400, manufactured by BRUKER CORP. (Germany)).

The content of a non-hydrogenated conjugated diene was calculated from the degree of hydrogenation of the double bond of the conjugated diene monomer unit, and the content of the conjugated diene monomer unit in the vinyl aromatic copolymer rubber (I) was calculated from the content of the non-hydrogenated conjugated diene and the content of isoprene.

(I-6) Tan δ Peak Temperature in Vinyl Aromatic Copolymer Rubber (I)

The dynamic viscoelasticity data was determined by cutting a sample into a size having a width of 10 mm and a length of 35 mm, setting the sample to an apparatus ARES (trade name, manufactured by TA Instruments Co., Ltd.) in a twist type geometry, and measuring under the conditions of an effective measurement length of 25 mm, a strain of 0.5%, a frequency of 1 Hz, and a temperature rising rate of 3° C./min from −80° C. to 150° C.

The peak temperature was determined by the automatic detection of peaks by "RSI Orchestrator" (trade name, manufactured by TA Instruments Co., Ltd.).

[II. Characteristics of Crosslinked Composition]

(II-1) Hardness: The Hardness was Measured According to JIS K 7215.

Note that a press sheet having a thickness of 6.3 mm was used as a test piece for measuring Type A durometer hardness.

It was determined that the test piece had practically sufficient flexibility when it had a Shore A hardness in the range of 50 to 70, (II-2) Tensile Stress, Tensile Strength, and Elongation at Break The tensile test was performed using dumbbell No. 3 at a crosshead speed of 500 mm/min according to JIS K6251.
Tensile stress (100% Mo): The stress at an elongation of 100% was measured.
Tensile strength (Tb): The stress at break was measured.
Elongation at break (Eb): The elongation at break was measured.

(II-3) Compression Set

The compression set test was performed according to JIS K6262.

The test was performed under the measurement conditions of a temperature of 120° C. for 22 hours.

It determined that heat resistance was good when the compression set was 35% or less.

(II-4) Softening Point

A 2-mm sheet of a crosslinked composition was used as a sample. The temperature (° C.) at which a probe having a load of 10 g penetrates up to 100 μm into the sample sheet was measured at a temperature rising rate of 3° C./min using TEM 100 manufactured by SEIKO I&E Ltd. The resulting temperature was defined as a softening point.

(II-5) Molding Processability

Extrusion moldability: A sheet having a width of 50 mm and a thickness of 1 mm was extruded, and the extrusion moldability was comprehensively determined by observing hard spots due to poor melting, drawdown properties, surface appearance, and shape.

○: Good: No particular problem.
Δ: Slightly poor: Intermediate level between Good and Poor.
X: Poor: The level that improvement is clearly needed.

(II-6) Degree of Crosslinking

About 100 mg of pellets of a crosslinked composition were weighed as a sample, which was immersed in 30 mL of cyclohexane in a sealed container at 23° C. for 48 hours.

Next, this sample was taken out on a filter paper and dried for 72 hours or more until it has constant weight at room temperature.

A value obtained by subtracting the mass of all the cyclohexane-insoluble components (such as crosslinking agent, additive, and filler) other than a copolymer rubber component and the mass of an olefinic resin (III) in the sample before cyclohexane immersion from the mass of the dry residue is defined as "the corrected final mass (Y)."

On the other hand, the sum of the mass of crosslinkable components, that is, a vinyl aromatic copolymer rubber (I) and an ethylenic copolymer rubber (II) of the sample is defined as "the corrected initial mass (X)."

The degree of crosslinking was calculated from these values by the following expression.

Degree of crosslinking[%]=(Y/X)×100

(Relation between softening point(S) and hardness(H)
S≥(½)×H+105)

The value of (½)×H+105 was calculated from the values of the (II-1) Hardness (Shore A hardness) and the (II-4) Softening Point.

Next, each component used in Examples and Comparative Example is shown below.

<Preparation of Hydrogenation Catalyst>

The hydrogenation catalyst used for the hydrogenation reaction of a polymer described below was prepared by the following method.

To a reaction vessel, the atmosphere of which had been replaced with nitrogen, was charged 1 liter of dried and purified cyclohexane. Thereto was added 100 mmol of bis(cyclopentadienyl)titanium dichloride. To the mixture was added a n-hexane solution containing 200 mmol of trimethylaluminum with sufficient stirring, and the resulting mixture was allowed to react at room temperature for about 3 days.

[Preparation of Vinyl Aromatic Copolymer Rubber (I)]

<Polymer A> Hydrogenated Product of Isoprene-Styrene-Butadiene-Styrene-Isoprene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 1.5 parts by mass of isoprene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 15 parts by mass of styrene, and the resulting mixture was polymerized for 30 minutes at 70° C.

Next, thereto was added a cyclohexane solution containing 67 parts by mass of butadiene, and the resulting mixture was polymerized for 1 hour at 70° C.

Next, thereto was added a cyclohexane solution containing 15 parts by mass of styrene, and the resulting mixture was polymerized for 30 minutes at 70° C.

Next, thereto was charged a cyclohexane solution containing 1.5 parts by mass of isoprene, and the resulting mixture was polymerized for 30 minutes at 70° C. to obtain an isoprene-styrene-butadiene-styrene-isoprene polymer.

The polymer obtained had a styrene content of 30% by mass, a polystyrene block content of 29.7% by mass, an isoprene content of 3% by mass, a vinyl bond content of a polybutadiene block part of 35% by mass, a molecular weight of the entire polymer of 212,000, a molecular weight of the polystyrene block of 64,000, and a molecular weight distribution of 1.05.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of the resulting hydrogenated block copolymer (Polymer A), the degree of hydrogenation of butadiene was 100%, and that of isoprene was 4%. The tan δ peak temperature observed was −43° C. and 100° C.

<Polymer B> Hydrogenated Product of Styrene-Isoprene-Butadiene-Isoprene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 1.5 parts by mass of isoprene, and the resulting mixture was polymerized for 30 minutes at 70° C.

Next, thereto was added a cyclohexane solution containing 67 parts by mass of butadiene, and the resulting mixture was polymerized for 1 hour at 70° C.

Next, thereto was added a cyclohexane solution containing 1.5 parts by mass of isoprene, and the resulting mixture was polymerized for 30 minutes at 70° C.

Next, thereto was charged a cyclohexane solution containing 15 parts by mass of styrene, and the resulting mixture was polymerized for 30 minutes at 70° C. to obtain an styrene-isoprene-butadiene-isoprene-styrene polymer.

The polymer obtained had a styrene content of 30% by mass, a polystyrene block content of 29.8% by mass, an isoprene content of 3% by mass, a vinyl bond content of a polybutadiene block part of 35% by mass, a molecular weight of the entire polymer of 213,000, a molecular weight of the polystyrene block of 64,000, and a molecular weight distribution of 1.04.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of the resulting hydrogenated block copolymer (Polymer B), the degree of hydrogenation of butadiene was 100%, and that of isoprene was 5%. The tan δ peak temperature observed was −43° C. and 100° C.

<Polymer C> Hydrogenated Product of Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 30 minutes at 70° C.

Next, thereto was added a cyclohexane solution containing 15 parts by mass of styrene, and the resulting mixture was polymerized for 30 minutes at 70° C. to obtain an styrene-butadiene-styrene polymer.

The polymer obtained had a styrene content of 30% by mass, a polystyrene block content of 29.7% by mass, a vinyl bond content of a polybutadiene block part of 35% by mass, a molecular weight of the entire polymer of 212,000, a molecular weight of the polystyrene block of 63,000, and a molecular weight distribution of 1.05.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer. With respect to the degree of hydrogenation of butadiene of the resulting hydrogenated block copolymer (Polymer C) was 80%. The tan δ peak temperature observed was −49° C. and 100° C.

<Polymer D> Hydrogenated Product of Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 30 minutes at 70° C.

Next, thereto was added a cyclohexane solution containing 15 parts by mass of styrene, and the resulting mixture was polymerized for 30 minutes at 70° C. to obtain an styrene-butadiene-styrene polymer.

The polymer obtained had a styrene content of 30% by mass, a polystyrene block content of 29.7% by mass, a vinyl bond content of a polybutadiene block part of 35% by mass, a molecular weight of the entire polymer of 212,000, a molecular weight of the polystyrene block of 63,000, and a molecular weight distribution of 1.03.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of butadiene of the resulting hydrogenated block copolymer (Polymer D) was 100%. Butadiene did not remain in the polymer, and the content of the conjugated diene monomer unit was 0% by mass. The tan δ peak temperature was −42° C. and 100° C.

<Polymer E> Hydrogenated Product of Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 30 minutes at 70° C.

Next, thereto was added a cyclohexane solution containing 15 parts by mass of styrene, and the resulting mixture was polymerized for 30 minutes at 70° C. to obtain an styrene-butadiene-styrene polymer.

The polymer obtained had a styrene content of 30% by mass, a polystyrene block content of 29.7% by mass, a vinyl bond content of a polybutadiene block part of 35% by mass, a molecular weight of the entire polymer of 214,000, a molecular weight of the polystyrene block of 64,000, and a molecular weight distribution of 1.04.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

The degree of hydrogenation of butadiene of the resulting hydrogenated block copolymer (polymer E) was 50%, and the content of residual butadiene was 35% by mass of the copolymer. The tan δ peak temperature was −48° C. and 100° C.

<Polymer F> Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 40 parts by mass of styrene was charged into the reactor. Then, thereto was added 0.04 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 20 parts by mass of butadiene, and the resulting mixture was polymerized for 30 minutes at 70° C.

Next, thereto was added a cyclohexane solution containing 40 parts by mass of styrene, and the resulting mixture was polymerized for 30 minutes at 70° C. to obtain an styrene-butadiene-styrene polymer.

The polymer obtained had a styrene content of 80% by mass, a polystyrene block content of 79.8% by mass, a vinyl bond content of a polybutadiene block part of 35% by mass, a molecular weight of the entire polymer of 211,000, a molecular weight of the polystyrene block of 63,000, and a molecular weight distribution of 1.04. The tan δ peak temperature was −68° C. and 100° C.

<Polymer G> Hydrogenated Product of Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.03 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 30 minutes at 70° C.

Next, thereto was added a cyclohexane solution containing 15 parts by mass of styrene, and the resulting mixture was polymerized for 30 minutes at 70° C. to obtain an styrene-butadiene-styrene polymer.

The polymer obtained had a styrene content of 30% by mass, a polystyrene block content of 29.7% by mass, a vinyl bond content of a polybutadiene block part of 35% by mass, a molecular weight of the entire polymer of 314,000, a molecular weight of the polystyrene block of 91,000, and a molecular weight distribution of 1.04.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of butadiene of the resulting hydrogenated block copolymer (Polymer E) was 70%, and the content of residual butadiene was 21% by mass of the copolymer. The tan δ peak temperature was −48° C. and 100° C.

<Polymer H> Hydrogenated Product of Styrene-Butadiene-Styrene

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene was charged into the reactor. Then, thereto was added 0.03 part by mass of n-butyl lithium based on 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 30 minutes at 70° C.

Next, thereto was added a cyclohexane solution containing 15 parts by mass of styrene, and the resulting mixture was polymerized for 30 minutes at 70° C. to obtain an styrene-butadiene-styrene polymer.

The polymer obtained had a styrene content of 30% by mass, a polystyrene block content of 29.7% by mass, a vinyl bond content of a polybutadiene block part of 35% by mass, a molecular weight of the entire polymer of 321,000, a molecular weight of the polystyrene block of 94,000, and a molecular weight distribution of 1.04.

Next, to the resulting polymer was added 100 ppm of the above hydrogenation catalyst in terms of titanium based on 100 parts by weight of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of butadiene of the resulting hydrogenated block copolymer (Polymer E) was 75%, and the content of residual butadiene was 17.5% by mass of the copolymer. The tan δ peak temperature was −47° C. and 100° C.

[Ethylenic Copolymer Rubber (II)]
EPDM Trade name: Nordel IP 4770R (manufactured by The Dow Chemical Company).

[Olefinic Resin (III)]
Polypropylene resin Trade name: PL 500A (manufactured by SunAllomer Ltd.), MFR (230° C., 2.16 kg); 3.3 g/min.

[Crosslinking Agent (IV)]
Polymethylol phenolic resin Trade name: TACKIROL 250-I (manufactured by Taoka Chemical Co., Ltd.).

[Crosslinking Auxiliary (V)]
Zinc oxide (manufactured by Wako Pure Chemical Industries, Ltd.)

[Rubber Softener (VI)]
Paraffin oil Trade name: PW-380 (manufactured by Idemitsu Kosan Co., Ltd.)

Examples 1 to 7, Comparative Examples 1 to 10

Each of the components as described above was melt kneaded according to the component ratio as shown in the following Table 1 using a twin-screw extruder (manufactured by Toyo Seiki Co., Ltd.) under a cylinder temperature of 210° C. and a screw rotation speed of 250 rpm to produce a crosslinked composition.

The results of measurement of physical properties of the resulting crosslinked compositions are shown in Tables 1 and 2.

TABLE 1

|  |  | Example 1 | Example 2 | Comparative Example 1 | Comparative Example 2 | Comparative Example 3 | Comparative Example 4 |
|---|---|---|---|---|---|---|---|
| Vinyl aromatic copolymer rubber (I) (A) | parts by mass | 50 |  | 100 |  |  |  |
| Vinyl aromatic copolymer rubber (I) (B) | parts by mass |  | 50 |  |  | 50 | 50 |
| Ethylenic copolymer rubber (II) | parts by mass | 50 | 50 |  | 100 | 50 | 50 |
| Olefinic resin (III) | parts by mass | 30 | 30 | 30 | 30 | 30 | 5 |
| Crosslinking agent (IV) | parts by mass | 3 | 3 | 3 | 3 |  | 3 |
| Crosslinking auxiliary (V) | parts by mass | 5 | 5 | 5 | 5 |  | 5 |
| Rubber softener (VI) | parts by mass | 100 | 100 | 100 | 100 | 100 | 100 |
| Shore A hardness | ° | 65 | 65 | 68 | 65 | 64 | 64 |

TABLE 1-continued

|  |  | Example 1 | Example 2 | Comparative Example 1 | Comparative Example 2 | Comparative Example 3 | Comparative Example 4 |
|---|---|---|---|---|---|---|---|
| Tb | MPa | 6.8 | 6.9 | 5.9 | 7.1 | 6.5 | 5.3 |
| 100% Mo | MPa | 2.8 | 2.9 | 2.7 | 3.1 | 2.4 | 2.4 |
| Eb | % | 550 | 560 | 530 | 520 | 760 | 370 |
| Compression set | % | 32 | 31 | 39 | 40 | 74 | 49 |
| Softening point | °C. | 145 | 147 | 130 | 70 | 106 | 93 |
| Molding processability | — | ○ | ○ | ○ | Δ | ○ | X |
| Degree of crosslinking | % | 91 | 92 | 85 | 92 | 0 | 94 |
| ½× shore A hardness + 105 | — | 137.5 | 137.5 | 139 | 137.5 | 137 | 137 |

TABLE 2

|  |  | Example 3 | Example 4 | Example 5 | Example 6 | Example 7 | Comparative Example 5 |
|---|---|---|---|---|---|---|---|
| Vinyl aromatic copolymer rubber (I) (C) | parts by mass | 50 |  |  |  |  |  |
| Vinyl aromatic copolymer rubber (I) (D) | parts by mass |  |  |  |  |  | 50 |
| Vinyl aromatic copolymer rubber (I) (E) | parts by mass |  |  |  |  |  |  |
| Vinyl aromatic copolymer rubber (I) (F) | parts by mass |  |  |  |  |  |  |
| Vinyl aromatic copolymer rubber (I) (G) | parts by mass |  | 50 |  |  |  |  |
| Vinyl aromatic copolymer rubber (I) (H) | parts by mass |  |  | 50 | 30 | 50 |  |
| Ethylenic copolymer rubber (II) | parts by mass | 50 | 50 | 50 | 70 | 50 | 50 |
| Olefinic resin (III) | parts by mass | 30 | 30 | 30 | 30 | 20 | 30 |
| Crosslinking agent (IV) | parts by mass | 3 | 3 | 3 | 3 | 3 | 3 |
| Crosslinking auxiliary (V) | parts by mass | 5 | 5 | 5 | 5 | 5 | 5 |
| Rubber softener (VI) | parts by mass | 100 | 100 | 100 | 100 | 100 | 100 |
| Shore A hardness | ° | 67 | 67 | 67 | 64 | 60 | 64 |
| Tb | MPa | 7.3 | 7.3 | 7.3 | 7.5 | 6.3 | 6.2 |
| 100% Mo | MPa | 3.1 | 3.1 | 3.1 | 2.9 | 2.7 | 2.4 |
| Eb | % | 510 | 510 | 510 | 490 | 400 | 570 |
| Compression set | % | 34 | 31 | 29 | 31 | 35 | 51 |
| Softening point | °C. | 143 | 147 | 151 | 149 | 137 | 110 |
| Molding processability | — | ○ | ○ | ○ | ○ | ○ | Δ |
| Degree of crosslinking | % | 91 | 92 | 92 | 92 | 93 | 80 |
| ½× shore A hardness + 105 | — | 138.5 | 138.5 | 138.5 | 137 | 135 | 137 |

|  |  | Comparative Example 6 | Comparative Example 7 | Comparative Example 8 | Comparative Example 9 | Comparative Example 10 |
|---|---|---|---|---|---|---|
| Vinyl aromatic copolymer rubber (I) (C) | parts by mass |  |  |  |  |  |
| Vinyl aromatic copolymer rubber (I) (D) | parts by mass |  |  |  |  |  |
| Vinyl aromatic copolymer rubber (I) (E) | parts by mass | 50 |  |  |  |  |
| Vinyl aromatic copolymer rubber (I) (F) | parts by mass |  | 50 |  |  |  |
| Vinyl aromatic copolymer rubber (I) (G) | parts by mass |  |  |  |  |  |
| Vinyl aromatic copolymer rubber (I) (H) | parts by mass |  |  | 100 | 50 | 50 |
| Ethylenic copolymer rubber (II) | parts by mass | 50 | 50 |  | 50 | 50 |
| Olefinic resin (III) | parts by mass | 30 | 30 | 30 | 30 | 5 |
| Crosslinking agent (IV) | parts by mass | 3 | 3 | 3 |  | 3 |
| Crosslinking auxiliary (V) | parts by mass | 5 | 5 | 5 |  | 5 |
| Rubber softener (VI) | parts by mass | 100 | 100 | 100 | 100 | 100 |
| Shore A hardness | ° | 69 | 74 | 70 | 65 | 56 |
| Tb | MPa | 6.3 | 7.6 | 6 | 6.5 | 5.3 |
| 100% Mo | MPa | 2.4 | 2.9 | 2.8 | 2.4 | 2.4 |
| Eb | % | 480 | 450 | 540 | 760 | 370 |
| Compression set | % | 39 | 53 | 39 | 45 | 42 |
| Softening point | °C. | 130 | 105 | 130 | 106 | 93 |
| Molding processability | — | Δ | Δ | ○ | ○ | X |
| Degree of crosslinking | % | 94 | 95 | 88 | 0 | 92 |
| ½× shore A hardness + 105 | — | 139.5 | 142 | 140 | 137.5 | 133 |

As shown in Tables 1 and 2, the crosslinked compositions of Examples 1 to 7 were excellent in flexibility, mechanical strength, and heat resistance, and showed good results also in molding processability.

This application is based on Japanese Patent Application No. 2011-201575 filed with the Japanese Patent Office on Sep. 15, 2011, the contents of which are incorporated herein by reference.

INDUSTRIAL APPLICABILITY

The crosslinked composition of the present invention has industrial applicability as reinforcing filler compounds, crosslinked products, foams, materials for multilayer films and multilayer sheets, building materials, vibration control soundproof materials, wire coating materials, high frequency fusion compositions, slush molding materials, adhesive compositions, asphalt compositions, medical supply materials, automobile materials, and the like; and the molded product has industrial applicability as sheets, films, tubes, nonwoven fabrics and fibrous molded products, synthetic leather, food packaging materials, medical supply materials, home electronics and parts thereof, electron devices and parts thereof, industrial components, household articles, raw materials for toys, raw materials for footwear, fiber materials, raw materials for adhesives, asphalt modifiers, and the like. In particular, the molded product has industrial applicability as a substitute part of vulcanized rubber which has been used as an automobile part.

The invention claimed is:

1. A crosslinked composition obtained by crosslinking a composition, comprising:
   1 to 99 parts by mass of a vinyl aromatic copolymer rubber (I) comprising 5 to 70% by mass of a vinyl aromatic monomer unit and 2.85 to 30% by mass of a conjugated diene monomer unit and having one or more tan δ peak temperatures between 75° C. and 125° C. and having one or more tan δ peak temperatures between −70° C. and −25° C. as obtained by dynamic viscoelasticity measurement (1 Hz);
   99 to 1 parts by mass of an ethylenic copolymer rubber (II);
   10 to 100 parts by mass of an olefinic resin (III) based on 100 parts by mass of a total amount of the vinyl aromatic copolymer rubber (I) and the ethylenic copolymer rubber (II); and
   0.01 to 50 parts by mass of a crosslinking agent (IV) based on 100 parts by mass of the total amount of the vinyl aromatic copolymer rubber (I) and the ethylenic copolymer rubber (II)
   wherein a softening point of the crosslinked composition is 135° C. or higher.

2. The crosslinked composition according to claim 1, wherein the vinyl aromatic copolymer rubber (I) has a conjugated diene monomer block at an end.

3. The crosslinked composition according to claim 1, wherein the vinyl aromatic copolymer rubber (I) is a hydrogenated product of a vinyl aromatic block copolymer comprising a vinyl aromatic monomer unit and a conjugated diene monomer unit.

4. The crosslinked composition according to claim 1, further comprising 1 to 300 parts by mass of a rubber softener (V) based on 100 parts by mass of the total amount of the vinyl aromatic copolymer rubber (I) and the ethylenic copolymer rubber (II).

5. The crosslinked composition according to claim 1, wherein the ethylenic copolymer rubber (II) is an ethylene-propylene-non-conjugated diene copolymer rubber (EPDM).

6. The crosslinked composition according to claim 1, wherein the olefinic resin (III) is polypropylene.

7. The crosslinked composition according to claim 1, wherein a proportion (degree of crosslinking) of a total mass of a crosslinked product of the vinyl aromatic copolymer rubber (I) and a crosslinked product of the ethylenic copolymer rubber (II) based on the total mass of the vinyl aromatic copolymer rubber (I) and the ethylenic copolymer rubber (II) is 90% or more.

8. A method for producing a crosslinked composition, comprising: a step of mixing a composition and dynamically crosslinking under a melting condition, the composition comprising,
   1 to 99 parts by mass of a vinyl aromatic copolymer rubber (I) comprising 5 to 70% by mass of a vinyl aromatic monomer unit and 2.85 to 30% by mass of a conjugated diene monomer unit and having one or more tan δ peak temperatures between 75° C. and 125° C. and having one or more tan δ peak temperatures between −70° C. and −25° C. as obtained by dynamic viscoelasticity measurement (1 Hz);
   99 to 1 parts by mass of an ethylenic copolymer rubber (II);
   10 to 100 parts by mass of an olefinic resin (III) based on 100 parts by mass of a total amount of the vinyl aromatic copolymer rubber (I) and the ethylenic copolymer rubber (II); and
   0.01 to 50 parts by mass of a crosslinking agent (IV) based on 100 parts by mass of the total amount of the vinyl aromatic copolymer rubber (I) and the ethylenic copolymer rubber (II)
   wherein a softening point of the crosslinked composition is 135° C. or higher.

9. A molded product obtained by molding the crosslinked composition according to claim 1.

10. A crosslinked composition according to claim 1 comprising a vinyl aromatic copolymer rubber, an ethylenic copolymer rubber, an olefinic resin, and a crosslinking agent, wherein, in a range of a hardness (H: Shore A hardness) of 60 to 90, a relation between a softening point (S(° C.)) and the hardness (H: Shore A hardness) satisfies the following condition:

$$S \geq (1/2) \times H + 105.$$

* * * * *